(12) United States Patent
Vignotto et al.

(10) Patent No.: US 6,776,420 B2
(45) Date of Patent: Aug. 17, 2004

(54) SEALING DEVICE FOR A ROLLING CONTACT BEARING

(75) Inventors: Angelo Vignotto, Turin (IT); Pierangelo Cherio, Turin (IT)

(73) Assignee: SKF Industrie S.p.A., Turin (IT)

( * ) Notice: Subject to any disclaimer, the term of this patent is extended or adjusted under 35 U.S.C. 154(b) by 27 days.

(21) Appl. No.: 10/171,197

(22) Filed: Jun. 12, 2002

(65) Prior Publication Data

US 2003/0016892 A1 Jan. 23, 2003

(30) Foreign Application Priority Data

Jul. 19, 2001 (IT) ..................................... TO2001A0708

(51) Int. Cl.$^7$ .............................................. F16J 15/72
(52) U.S. Cl. .................... 277/572; 277/549; 277/551; 277/569; 277/571; 384/446; 384/448; 384/476
(58) Field of Search ................................ 277/549, 551, 277/569, 571, 572; 384/446, 448, 476

(56) References Cited

U.S. PATENT DOCUMENTS

| 5,004,358 A | * | 4/1991 | Varvello et al. ............ 384/446 |
| 5,382,098 A | * | 1/1995 | Rigaux et al. .............. 384/448 |
| 5,575,568 A | | 11/1996 | Rigaux et al. |
| 5,898,388 A | * | 4/1999 | Hofmann et al. ....... 340/870.31 |
| 6,170,992 B1 | * | 1/2001 | Angelo et al. .............. 384/477 |

* cited by examiner

Primary Examiner—Anthony Knight
Assistant Examiner—Enoch E Peavey
(74) Attorney, Agent, or Firm—Merchant & Gould, P.C.

(57) ABSTRACT

Sealing device (1) for a rolling contact bearing (2) presenting an annular sealing lining (5), a protective shield (6) for the lining (5) which is mounted on the outside of the lining (5) itself, and an encoder (15) which is integral to the shield (6) and which is protected by a covering element (16) arranged opposite the shield (6) in relation to the encoder (15).

3 Claims, 3 Drawing Sheets

SEALING DEVICE FOR A ROLLING CONTACT BEARING

DESCRIPTION

The present invention relates to a sealing device for a rolling contact bearing.

In particular, the present invention relates to a sealing device for a rolling contact bearing which comprises an annular sealing lining which is mounted onto a fixed race of the rolling contact bearing, a protective shield for the lining which is mounted onto a rotating race of the rolling contact bearing, and an encoder which is integral to the shield and which is positioned between the lining and the shield itself.

The U.S. Pat. No. 5,575,568 relates to a sealing device of the kind described above, in which the shield is made of non-magnetic material in order to permit the encoder to be magnetised on the outer side of the rolling contact bearing, and presenting an overall thickness which is quite considerable in order to guarantee a sufficiently rigid support for the encoder, not only when it is in use but also during the operations which are necessary to assemble the device itself.

Despite all the precautions taken during the assembly of the shield which has just been described above, the device referred to the in the U.S. Pat. No. 5,575,568 does, however, present some disadvantages which are typical of the kind of assembly necessary, during which the magnetisation of the encoder is carried out by means of a layer of material which is extraneous to the encoder itself and which is, in fact, represented by the support shield.

The aim of the present invention is to produce a sealing device for a rolling contact bearing, which will permit an optimal magnetisation of the encoder without compromising the protection of the encoder itself in any way at all, either during transport or when the device is mounted onto the relevant rolling contact bearing.

According to the present invention, a sealing device for a rolling contact bearing will be produced presenting a fixed race and a rotating race, the device comprising an annular sealing lining which is mounted onto the fixed race, a protective shield for the lining which is mounted onto the rotating race on the outside of the lining itself, and an encoder which is integral to the shield; the device being characterised by the fact that the encoder is axially arranged on the outside of the shield and is protected by a covering element, which is part of the device itself, and which is arranged opposite the screen in relation to the encoder.

The invention will now be described with reference to the attached drawings, which illustrate a non-limiting form of embodiment of the said invention, and in which.

Figure 1:
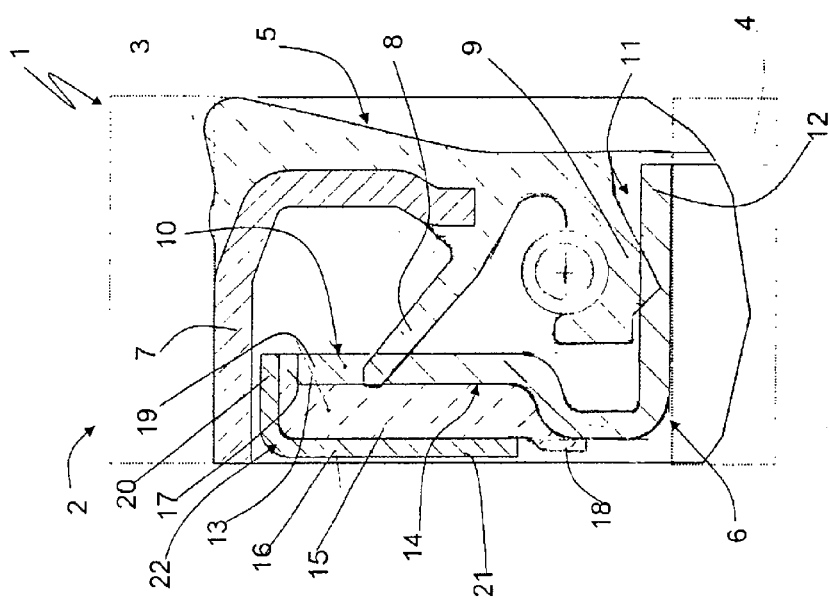
FIG. 1 is an axial section view, with some parts removed for reasons of clarity, of a first preferred form of embodiment of a sealing device for a rolling contact bearing according to the present invention.

With reference to FIG. 1, the number 1 is used to indicate, in its entirety, a sealing device for a rolling contact bearing 2, which comprises an outer fixed race 3 and an inner rotating race 4.

The device 1 is mounted between the two races 3 and 4, and comprises an annular sealing lining 5 which is mounted onto the fixed race 3, and protective shield 6 for the lining 5 which is mounted onto the rotating race 4 on the outside of the lining 5 itself.

In the example which is illustrated, the lining 5 presents a metal support 7, which is substantially L-shaped in axial section, and two sealing lips 8 and 9 which extend from the support 7 starting from a free edge of the support 7 itself, and of which the lip 8 extends in contact with an inner annular surface 10 of the shield 6, and the lip 9 extends in contact with an inner cylindrical surface 11 of the shield 6 itself.

The shield 6 comprises a cylindrical body 12 which is shrink fit onto the rotating race 4 and which defines the surface 11, and a grooved flange 13, which defines the surface 10, and which is made of magnetic or non-magnetic iron material, and which forms a housing 14 which his axially open towards the outside of the rolling contact bearing 2.

The device 1 also comprises an encoder 15 which is integral to the shield 6, which is axially arranged on the outside of the shield 6 itself and on the inside of the housing 14, and which is protected by a covering element 16, which is part of the device 1 itself and which is arranged opposite the flange 13 in relation to the encoder 15.

The encoder 15 may be made of magnetised plastic or rubber, and is provided with two end appendages 17 and 18, of which the appendage 17 is arranged over and in contact with a free end 19 of the flange 13 and on the outside of the housing 14, while the appendage 18 is arranged in an axially frontal position to the flange 13 itself and on the outside of the housing 14.

The element 16 may be made of any kind of material, and comprises a cylindrical wall 20 which is arranged so as to cover the appendage 17, and an annular wall 21 which is arranged so as to cover the entire encoder apart from the appendage 18. The two walls 20 and 21 are connected to each other by a rounded edge which presents a determined radius of bending.

Figure 2:
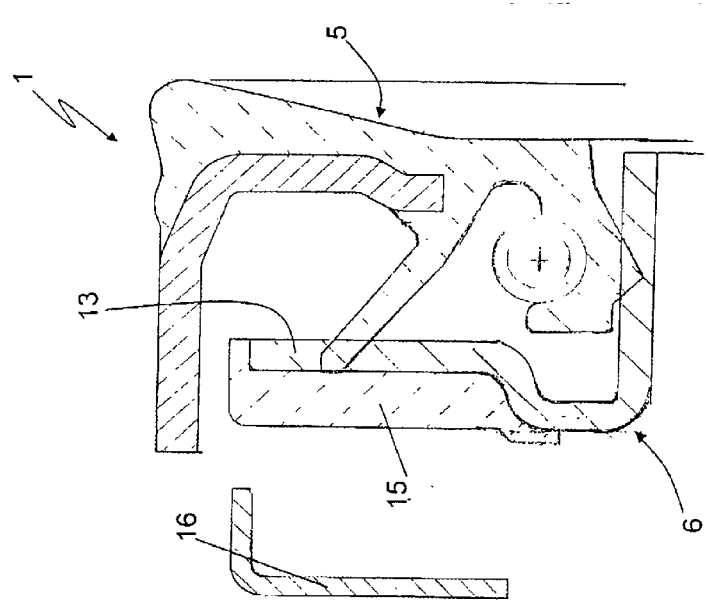
FIG. 2 is an axial section view of a stage of assembly of the device which is illustrated in FIG. 1.

The encoder 15 is fixed onto the flange 13 by means of either pressing or vulcanisation according to the kind of material of which it is made, and is magnetised together with the shield 6. Instead, as shown in FIG. 2, the covering element 16 is coupled to the encoder 15 and the shield 6 either mechanically or by means of sticking after the encoder 15 itself has been magnetised.

In this way, it is possible to supply the best possible protection to the encoder 15 without compromising the magnetisation of the encoder 15 itself in any way at all.

Figure 4:
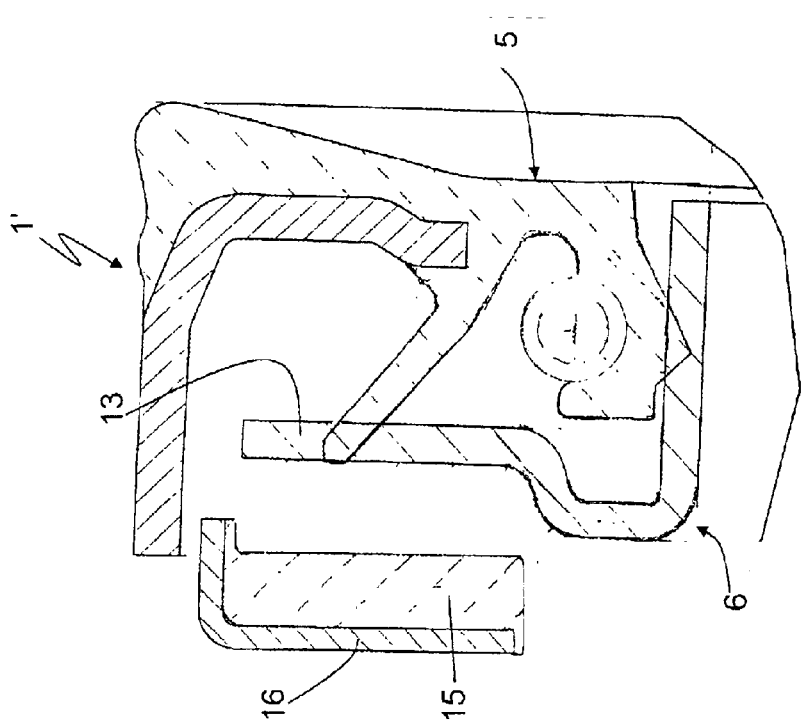
FIG. 4 is an axial section view of a stage of assembly of the device which is illustrated in FIG. 3.
Figure 3:
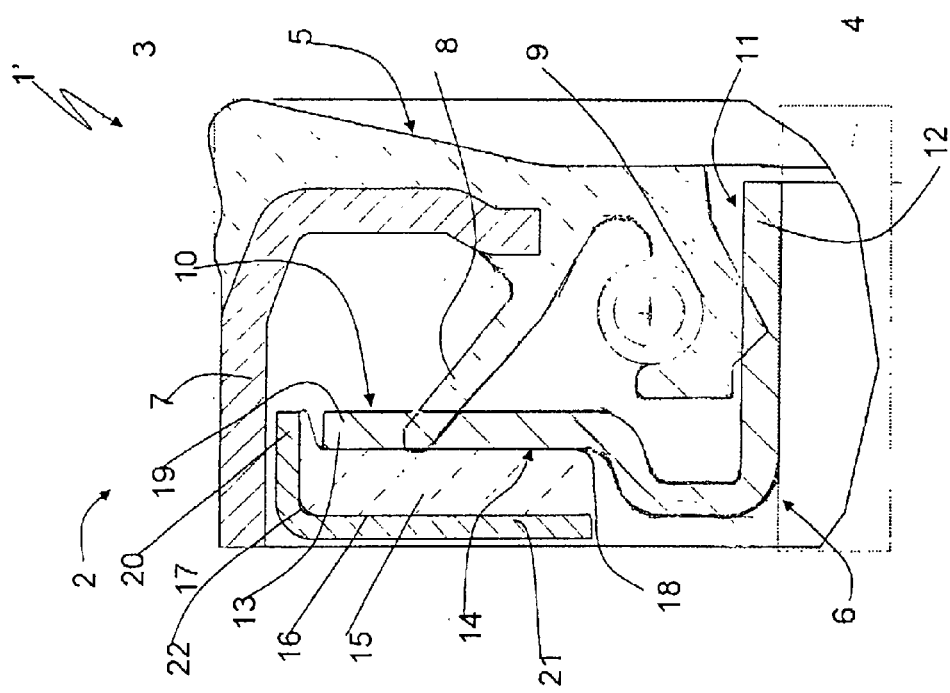
FIG. 3 is an axial section view, with some parts removed for reasons of clarity, of a second preferred form of embodiment of the sealing device for a rolling contact bearing illustrated in FIG. 1.

The form of embodiment which is illustrated in FIG. 3 relates to a device 1' which is similar to the device 1, from which the device 1' differs mainly due to the fact that the appendages 17 and 18 of the encoder 15 are turned in contact with the element 16. Furthermore, as is better illustrated in FIG. 4, the encoder 15 is fixed to the element 16 by means of either pressing or vulcanisation, depending on the kind of material of which it is made, and is magnetised together with the element 16 itself before being coupled to the shield 6 either mechanically or by means of sticking.

In this case, it is also possible to supply the best possible protection to the encoder 15 without compromising the magnetisation of the encoder 15 itself in any way at all.

Figure 6:
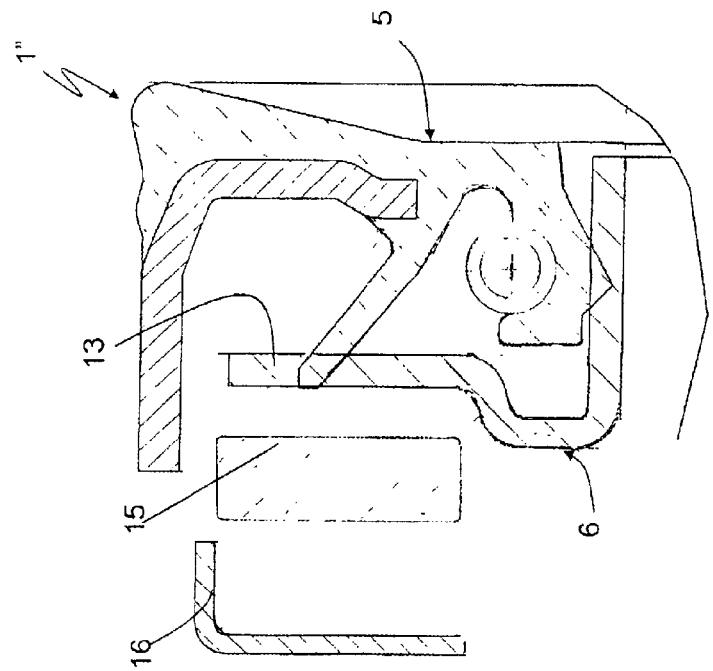
FIG. 6 is an axial section view of a stage of assembly of the device which is illustrated in FIG. 5.
Figure 5:
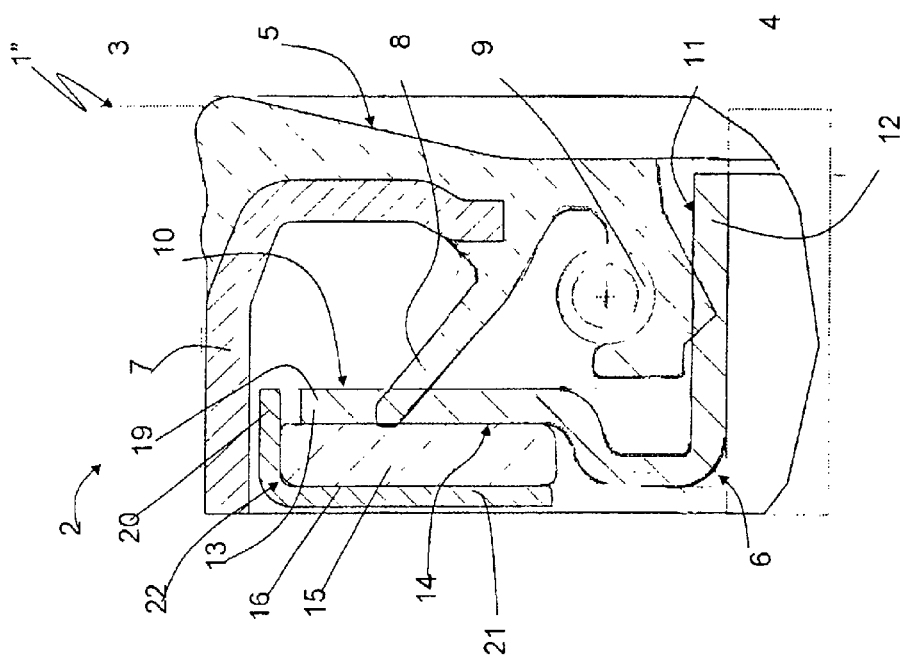
FIG. 5 is an axial section view, with some parts removed for reasons of clarity, of a second preferred form of embodiment of the sealing device for a rolling contact bearing which is illustrated in FIG. 1.

The form of embodiment which is illustrated in FIG. 5 relates to a device 1" which is similar to the device 1, from which the device 1" differs mainly due to the fact that the encoder 15 is not provided with the appendages 17 and 18. Furthermore, as is better illustrated in FIG. 6, the encoder 15 is fixed onto the shield 6 by the covering element 16 and is independent from both the shield 6 and the element 16 themselves.

In this case, the encoder 15 is magnetised totally independently from the elements of the device 1", and is then fixed onto the shield 6 by means of simply metallically anchoring the element 16 onto the shield 6 itself.

It is intended that the present invention not be limited to the forms of embodiment herein described and illustrated, which are to be considered as examples of forms of embodiment of the sealing device for a rolling contact bearing, which may be subject to further modifications in relation to the shape and arrangement of the parts, as well as the details of construction and assembly.

What is claimed is:

1. Sealing device for a rolling contact bearing presenting a fixed race and a rotating race, the device comprising:
   an annular sealing lining which is mounted onto the fixed race,
   a protective shield for the lining which is mounted onto the rotating race on the outside of the lining,
   an encoder which is fixed to said protective shield by means of either pressing or vulcanization, and is magnetized together with the protective shield; and
   a covering element; wherein
      the encoder is axially arranged on the outside of the protective shield and is protected by said covering element, said covering element being arranged opposite the protective shield in relation to the encoder and coupled to the encoder and to the protective shield after the encoder itself has been magnetized, and
      the protective shield presents a grooved flange which defines a housing for the encoder, said encoder being provided with two end appendages which are arranged, respectively, radially and axially on the outside of the housing; wherein a first end appendage of said two end appendages is covered by the covering element and a second end appendage of said two end appendages extends outside the covering element.

2. Device according to claim 1, wherein the encoder is fixed to the covering element by means of either pressing or vulcanization, and is magnetized together with the covering element.

3. Sealing device for a rolling contact bearing presenting a fixed race and a rotating race, the device comprising:
   an annular sealing lining which is mounted onto the fixed race,
   a protective shield for the lining which is mounted onto the rotating race on the outside of the lining,
   an encoder which is integral to the protective shield, and
   a covering element; wherein
      the encoder is axially arranged on the outside of the protective shield and is protected by the covering element, said covering element being arranged opposite the protective shield in relation to the encoder,
      the encoder is fixed to the covering element by means of either pressing or vulcanization, and is magnetized together with the covering element, the protective shield being coupled to the encoder and the covering element after the encoder itself has been magnetized,
      the protective shield presents a grooved flange which defines a housing for the encoder, which is provided with two end appendages which are, respectively, arranged radially and axially on the outside of the housing, and said two end appendages are both arranged under the covering element.

* * * * *